United States Patent [19]

Bruggendick

[11] Patent Number: 5,344,616
[45] Date of Patent: Sep. 6, 1994

[54] APPARATUS FOR THE SEPARATION OF UNDESIRABLE CONSTITUENTS FROM A WASTE GAS

[75] Inventor: Hermann Bruggendick, Hunxe, Fed. Rep. of Germany

[73] Assignee: Steag Aktiengessllschaft, Essen, Fed. Rep. of Germany

[21] Appl. No.: 720,762
[22] PCT Filed: Jul. 13, 1989
[86] PCT No.: PCT/EP89/00810
§ 371 Date: Jul. 31, 1991
§ 102(e) Date: Jul. 31, 1991
[87] PCT Pub. No.: WO90/07371
PCT Pub. Date: Jul. 12, 1990

[30] Foreign Application Priority Data

Dec. 30, 1988 [DE] Fed. Rep. of Germany ....... 3844422

[51] Int. Cl.$^5$ ............................................. B01D 50/00
[52] U.S. Cl. ................................... 422/171; 422/177; 422/219; 422/220; 96/138
[58] Field of Search ............... 422/129, 141, 145, 168, 422/169, 170, 181, 192, 193, 216, 219–220, 236, 171, 177; 55/1, 16, 66, 74, 77, 78–79, 181, 390

[56] References Cited

U.S. PATENT DOCUMENTS

| | | | |
|---|---|---|---|
| 2,684,729 | 7/1954 | Berg . | |
| 2,697,654 | 12/1954 | Evans | 422/216 |
| 3,981,355 | 9/1976 | Squires | 165/104.16 X |
| 4,149,858 | 4/1979 | Noack et al. | 55/73 |
| 4,292,054 | 9/1981 | Noack et al. | 55/181 |
| 4,670,226 | 6/1987 | Furuyama et al. | 422/216 |
| 4,744,804 | 5/1988 | Furuyama et al. | 55/79 |

FOREIGN PATENT DOCUMENTS

| | | |
|---|---|---|
| 0193135 | 9/1986 | European Pat. Off. . |
| 2626939 | 12/1977 | Fed. Rep. of Germany . |
| 3605589 | 9/1986 | Fed. Rep. of Germany . |
| 3619496 | 12/1986 | Fed. Rep. of Germany . |
| 3523417 | 1/1987 | Fed. Rep. of Germany . |
| 3427905 | 10/1987 | Fed. Rep. of Germany . |
| 3732567 | 11/1988 | Fed. Rep. of Germany . |
| 3720045 | 1/1989 | Fed. Rep. of Germany . |
| 52-60274 | 5/1977 | Japan . |
| 53-4768 | 1/1978 | Japan . |
| 57-177330 | 1/1982 | Japan . |
| 56-62522 | 5/1981 | PCT Int'l Appl. . |
| WO88/06482 | 9/1988 | World Int. Prop. O. . |

*Primary Examiner*—Robert J. Warden
*Assistant Examiner*—Krisanne M. Thornton
*Attorney, Agent, or Firm*—Young & Thompson

[57] ABSTRACT

Apparatus for the separation of undesirable constituents from a waste gas, with a first reaction stage (4) defining at least one reaction chamber (14), exhibiting on the head side feeding structure and on the bottom side funnel-shaped discharge structure for the feeding and discharging of a lumpy or granular adsorbent. The feeding structure is formed by a grid of several feed hoppers (18) arranged in side-by-side relationship and one behind the other. The discharge structure is formed by a further grid of discharge hoppers (20) arranged in side-by-side relationship and one behind the other. At least on one side as well as in the head zone of the reaction chamber (14), waste gas passages are provided.

7 Claims, 4 Drawing Sheets

APPARATUS FOR THE SEPARATION OF UNDESIRABLE CONSTITUENTS FROM A WASTE GAS

The invention relates to a process for the separation of undesirable constituents from a fluid, especially a waste gas, by adsorption on a lumpy or granular adsorbent wherein the waste gas to be treated flows through at least one reaction chamber filled with adsorbent and is conducted through at least one adsorption layer. The invention furthermore concerns an apparatus for performing this process.

DOS 2,626,939 shows a process of the pertinent type wherein the fluid is conducted within the reaction chamber through two layers moving in parallel to each other, and the adsorbent in the layer on the downstream side is moved at a higher velocity and loaded to a lesser extent than in the layer on the upstream side. This conventional process is to effect a maximally extensive cleaning of the waste gas, since the waste gas is still exposed to an adequate amount of fresh adsorbent on the downstream side. On the other hand, adsorbent must be continuously withdrawn and regenerated in a relatively thick layer on the downstream side, and this adsorbent is exploited to an only very limited extent. The reaction chamber is subdivided by vertical partitions. The individual compartments are supplied with adsorbent from a central filling opening and comprise discharge openings and/or hoppers associated with the individual layers.

It is known from German Patent 3,427,905 to make the flow of adsorbent particles uniform by baffles arranged over the cross section of the moving bed.

In conventional adsorption units, essential parts of, in particular, the charging cone in the head zone and the discharge cone in the bottom zone of the reactor cannot be reached by the transversely flowing fluid, or can be reached only inadequately. As a consequence, hot spots (concentrations of heat) arise which may become the source of a fire in the head zone, and accumulations of condensate occur, associated with caking of particles, in the bottom zone of the reactor.

The invention is based on the object of providing improved flow of the fluid to be treated through the adsorbent bed and avoiding any disturbances in operation, especially in the critical head and discharge zones of the adsorber.

Starting with a process of the type discussed above, the invention provides for achieving this object that the adsorbent is introduced into the reaction chamber and discharged therefrom through several separate feed and discharge hoppers in a grid-like distribution, and that the fluid is guided in part from the side transversely to the adsorption layer and in part vertically through the reaction chamber so that the adsorbent in all zones of the reaction chamber participates practically uniformly in the adsorption. In this connection, it is especially advantageous, on the one hand, to conduct the waste gas through at least two separate adsorption layers and, on the other hand, to introduce the fluid partially from above into the reaction chamber.

As far as the apparatus is concerned, the above objective has been attained according to this invention by providing that the feeding means are constituted by a grid of several feed hoppers disposed in side-by-side and series relationship, and the discharge means are formed by a further grid of discharge hoppers arranged side-by-side and in series relationship, and that fluid passages are arranged at least on one side as well as in the head zone of the reaction chamber.

By grouping the feeding and discharge zones of the adsorbent into a plurality of conical subsections, the pockets of material in the head and bottom zones of the reactor that are hard to reach for the fluid flow are minimized. Furthermore, the particle flow and the mechanics of the bulk material within the reaction chamber are improved during feeding as well as during discharging of the adsorbent due to the segmenting into component streams. Although the main stream of the fluid is oriented transversely to the adsorbent column, fresh adsorbent in the head zone of the reactor participates to an increased extent in the reaction on account of the fluid introduced into the reaction chamber or discharged from the reaction chamber at that location.

Different pollutants, such as, for example, $SO_2$ and $NO_x$, exhibit, as is known, differing reaction velocities with the customary active carbon adsorbents. The improved adjustability of the adsorption fronts made possible by breaking up the charging and discharge cones can be advantageously exploited, in a further development of the invention, in that various undesirable fluid constituents, for example Hg, $SO_2$, HCl and $NO_x$, are separated in different vertical adsorption layers and are conducted out of the reaction chamber in separate streams. The adsorbents withdrawn in separate streams can then be subjected to differing further processing steps. The adsorbent streams loaded with especially highly reactive heavy metals, e.g. Hg, are disposed of separately. Similar remarks apply also with respect to adsorbent loaded with $SO_2$ and HCl. In both cases, so-called hearth furnace coke (HFC) is sufficient, i.e. active carbonized lignite, the regeneration of which is uneconomical. In contrast, pelletized the regeneration and reuse in an $NO_x$ reduction stage active carbonized coal is preferred as the adsorbent in $NO_x$ reduction. The price of the latter coal renders the regeneration and reuse in an $NO_x$ reduction stage economically practicable.

In a suitable further development of the process, varying flow velocities are imparted to the fluid while passing through different adsorption layers. Such differing flow velocities make sense, in particular, in case differing adsorbents, such as, for example, HFC and active carbonized coal are utilized in a series arrangement of several adsorption layers or reaction chambers. The HFC occurring normally as a relatively fine-grained fractional mixture with a particle size of between 1 and 4 mm should be exposed to a substantially slower throughflow of the fluid than the active carbonized coal which is usually pelletized uniformly, for example with 4 mm. If the same fluid stream is conducted in succession through several adsorption layers, then the flow velocities in these adsorption layers can be set by dimensioning the flow-exposed surfaces respectively associated with the adsorption layers.

The invention is per se independent of the type of adsorbent bed employed. In contrast to the conventionally moving bed processes, a fixed bed is utilized with preference in the invention which is exchanged cyclically, i.e. after extensive loading, rather than continuously. The use of fixed beds with an especially simple bulk material mechanics and operational handling presents itself in this invention due to the possibility of the accurate adjustment of the adsorption fronts of varying pollutants and on account of improved throughflow over the entire adsorbent column.

In a further development of the invention, an even more reliable prevention of condensate formation in the bottom zone of the reactor can be achieved by providing that the discharge hoppers and/or discharge tubes adjoining the latter are exposed to flowing fluid and are heated by the fluid. The fluid exiting from a first reaction stage and cleaned of at least several pollutants is recycled underneath the distributor plate and thereby heats the adsorbent-filled discharge hoppers and their discharge tubes.

However, a portion of the fluid can also be introduced into the reaction chamber from below through the adsorbent discharge hoppers. The effect of the portion of the fluid to be cleaned that is introduced quasi countercurrently from the bottom corresponds to the effect of the partial fluid stream introduced or discharged on the head side; in other words, the amount of adsorbent present in the hoppers on the discharge side is made to participate directly in the adsorption so that even small residues of still unloaded grains can be completely exploited before they are discharged.

Since it is possible with the aid of the process according to this invention to effect an individual separation of various pollutants in various vertical adsorbent layers or series-connected reaction stages, the process of the invention is particularly suitable for the complex flue gas purification in refuse incinerating plants wherein typically greatly differing pollutants arise. The invention permits a separation of greatly differing constituents in a basically unitary on-line procedure.

A preferred embodiment of the apparatus according to this invention, combining the advantages of an especially compact structure with optimum adjustability of the flow-exposed surfaces and fluid velocities in the individual adsorption layers is distinguished according to the invention in that at least two annular reaction chambers are concentrically arranged in a cylindrical housing, that the two annular chambers for the fluid stream are connected in series, and that the flow-exposed surface of the annular chamber that is the first for the fluid stream is larger than that of the second annular chamber. With nestling of the at least two annular chambers, a compact structure as well as short flow paths are obtained. The size of the predominantly cylindrical flow-exposed surfaces can be adjusted in a simple way by a suitable dimensioning of the radii. A uniform flow in the at least two annular chambers can be attained by radial flow through the annular chambers and, respectively, through the annular adsorbent beds.

Suitable further developments of the apparatus of this invention are characterized in the dependent claims. Partial combinations and subcombinations of the features of the claims are likewise considered essential to the disclosure of this invention.

BRIEF DESCRIPTION OF THE DRAWINGS

The invention will be described in greater detail below with reference to embodiments illustrated schematically in the drawings wherein.

Figure 1:
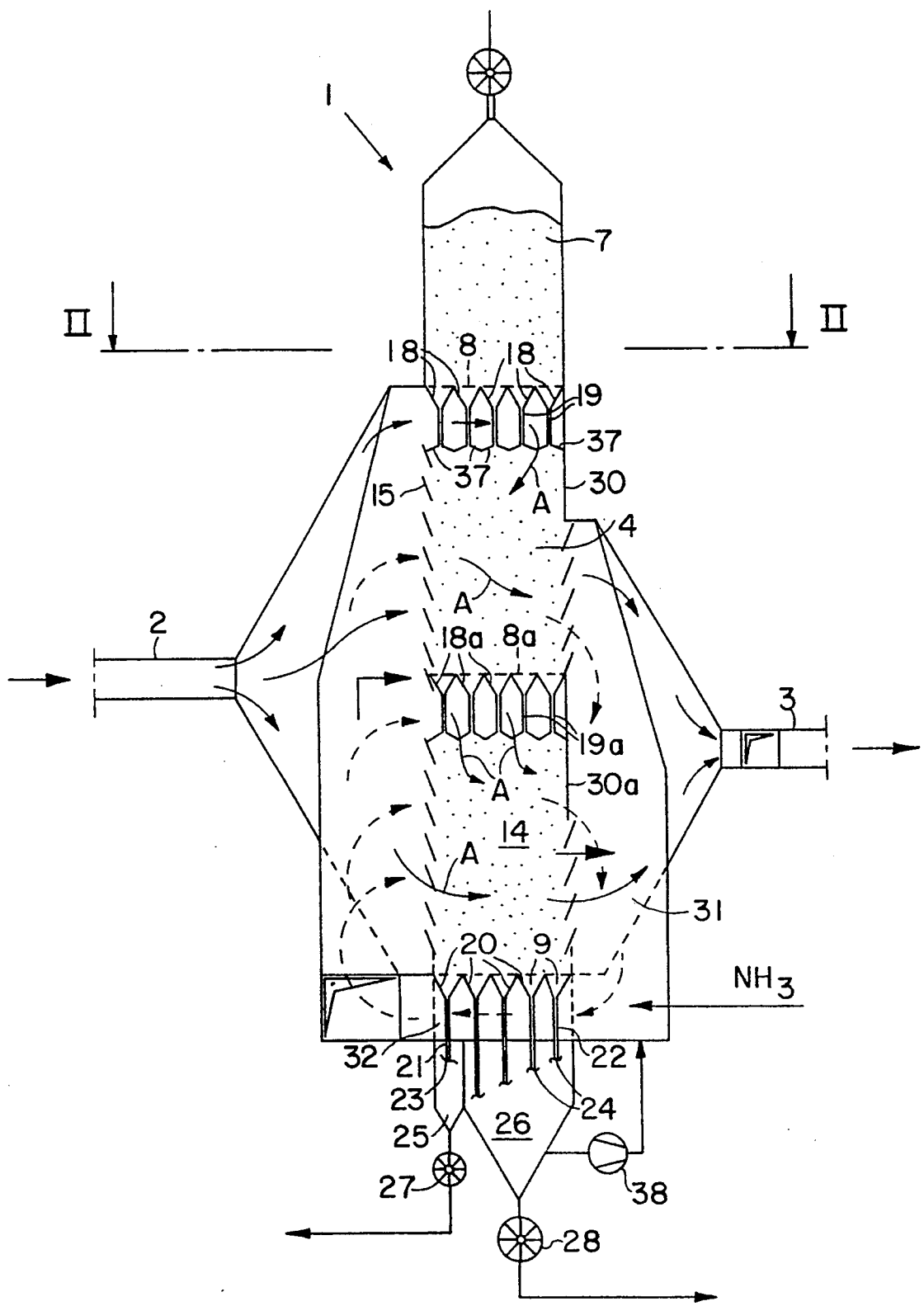
FIG. 1 is a vertical section through one embodiment of the adsorption apparatus according to the invention.
Figure 2:
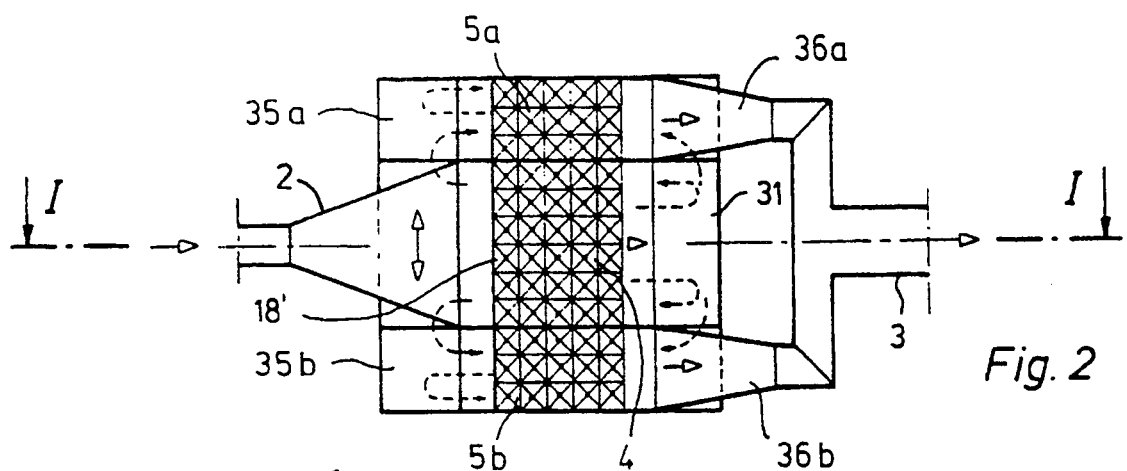
FIG. 2 shows a view along section line II—II in FIG. 1.

The adsorber 1 illustrated in FIGS. 1 and 2 in vertical and horizontal sections comprises a crude gas inlet 2 and a pure gas outlet 3. Between the inlet and outlet, the fluid flows through a first reaction stage 4 and a second reaction stage subdivided into two parallel-connected reaction chambers 5a and 5b (FIG. 2).

The first reaction stage 4 has a reaction chamber 14 of rectangular cross section which, during operation, is filled with a bulk packing bed of lumpy or granular adsorbent. On the inlet side, the chamber 14 is defined by a louver 15 extending over the full height of the chamber, and on the outlet side the chamber is defined by a louver 16 extending only up to a limited height. The charging of the adsorbent takes place from a storage container 7 attached on top of the chamber 14 via a distributor plate 8 on the head side. The distributor plate consists of a grid, uniform in the illustrated embodiment, of square feed hoppers 18 arranged side-by-side and one behind the other in rows and columns, adjoined by feed tubes 19 terminating into the chamber 14.

An intermediate plate 8a is installed at approximately half the height of the chamber 14. This plate serves, above all, for pressure relief in case of high adsorption beds and, in the illustrated example, has the same design and arrangement (grids of feed hoppers 18a and feed tubes 19a and barrier section 30a) as the distributor plate 8. Also the conductance of the fluid through the charging cones below the intermediate plate 8a corresponds to that in the head zone. The installation of one or several intermediate plates 8a in the reaction chamber is not necessary, but frequently expedient.

A discharge plate 9 is made up, in a similar manner as the distributor plate 8, of a grid of discharge hoppers 20 arranged in side-by-side and series relationship. Discharge tubes 21 and 22, respectively, adjoin the discharge hoppers 20. The discharge tubes 21 are sealed by closing elements, for example flaps or slides 23, and the discharge tubes 22 are closed off by closing elements 24. In order to withdraw the packing from the chamber 14, the closing elements 23, 24 are operated in a conventional way. The discharge tubes terminate in different collecting tanks 25 and 26, respectively, from which the adsorbent, loaded with the separated pollutants, can be removed for further processing, with the aid of suitable conveying means—here illustrated as a rotary vane charging gate 27, 28 comprising metering devices.

The layer of packing corresponding to the row 18' of feed hoppers on the inlet side, and correspondingly also of discharge hoppers 20 is preferably partitioned off from the remaining packed column by a suitable louver 17 and/or other suitable baffle elements (FIG. 3), so that the adsorption layer 40 between the inlet louver 15 and the partition 17 can be carried away separately via the associated discharge hoppers 20, discharge tubes 21, collecting tank 25, and conveying device 27. Corresponding remarks apply, of course, also to adsorption layers 41 on the downstream side of the partition 17.

The crude gas inlet 2 flares to the total height dimension of the reaction chamber 14, namely up to the region of the feed hoppers 18 and feed tubes 19. Therefore, the fluid can enter from the side through the louver 15, as well as between the feed tubes 19 from above through the charging cones 37 into the adsorbent bed, as depicted by the solid arrows A in FIG. 1. Thus, the fluid can reach all packing bed zones, not only in case of a moving bed, but also in case of a fixed bed. Consequently, practically all particles participate equally in the reaction.

On the outlet side, a barrier zone in the form of a closed wall 30 is provided between the uppermost layer (charging cone 37) and the upper end of the louver 16 on the downstream side; this wall prevents short-circuiting of the fluid from above directly into the outlet duct 31.

The outlet duct 31 passes over into a horizontal duct section 32 extending below the discharge plate 9. The prepurified fluid leaving the reaction chamber 14 through the outlet duct 31 flows, in the duct section 32, around the discharge hoppers 20 and the discharge tubes 21, 22 and during this step heats the adsorbent present in these elements to such an extent that condensation is reliably precluded. The fluid is deflected from the duct section 32 upwardly into a fluid inlet zone 35a and 35b for the two chambers 5a and 5b of the second reaction stage (FIG. 2). The fluid distribution in the two chambers 5a and 5b corresponds in principle to the aforedescribed fluid distribution at the louver 15 on the inlet side and the charging cones 37 on the head side of the first reaction stage 4. Feed and discharge hoppers are likewise arranged in grid form in the two chambers 5a and 5b in order to ensure a maximally uniform participation of the adsorbent in the entire interior of the chambers 5a and 5b. The loaded adsorbent, though, is normally removed through all of the discharge hoppers and tubes of the second reaction stage 5a and 5b simultaneously. Also the outlet ducts 36a and 36b have a configuration corresponding to the outlet duct 31 in the region of the louver of the two reaction chambers 5a and 5b on the downstream side, so that a large-area transverse flow of the fluid is also provided for in chambers 5a and 5b. The two ducts 36a and 36b are joined in correspondence with the illustration in FIG. 2 in the pure gas outlet 3.

The two reaction stages 4 and 5 are arranged in side-by-side relationship wherein the second reaction stage is subdivided into two component chambers 5a and 5b. This combination links the advantages of a compact structural form with satisfactory utilization and loading of the adsorbents and simple control capabilities for the adsorption fronts.

The duct section 32 can, in certain cases, also be made of such a width that it extends over the full breadth of the three juxtaposed reaction chambers 5a, 4 and 5b and thereby also heats the discharge tubes of the chambers 5a and 5b.

Figure 3:
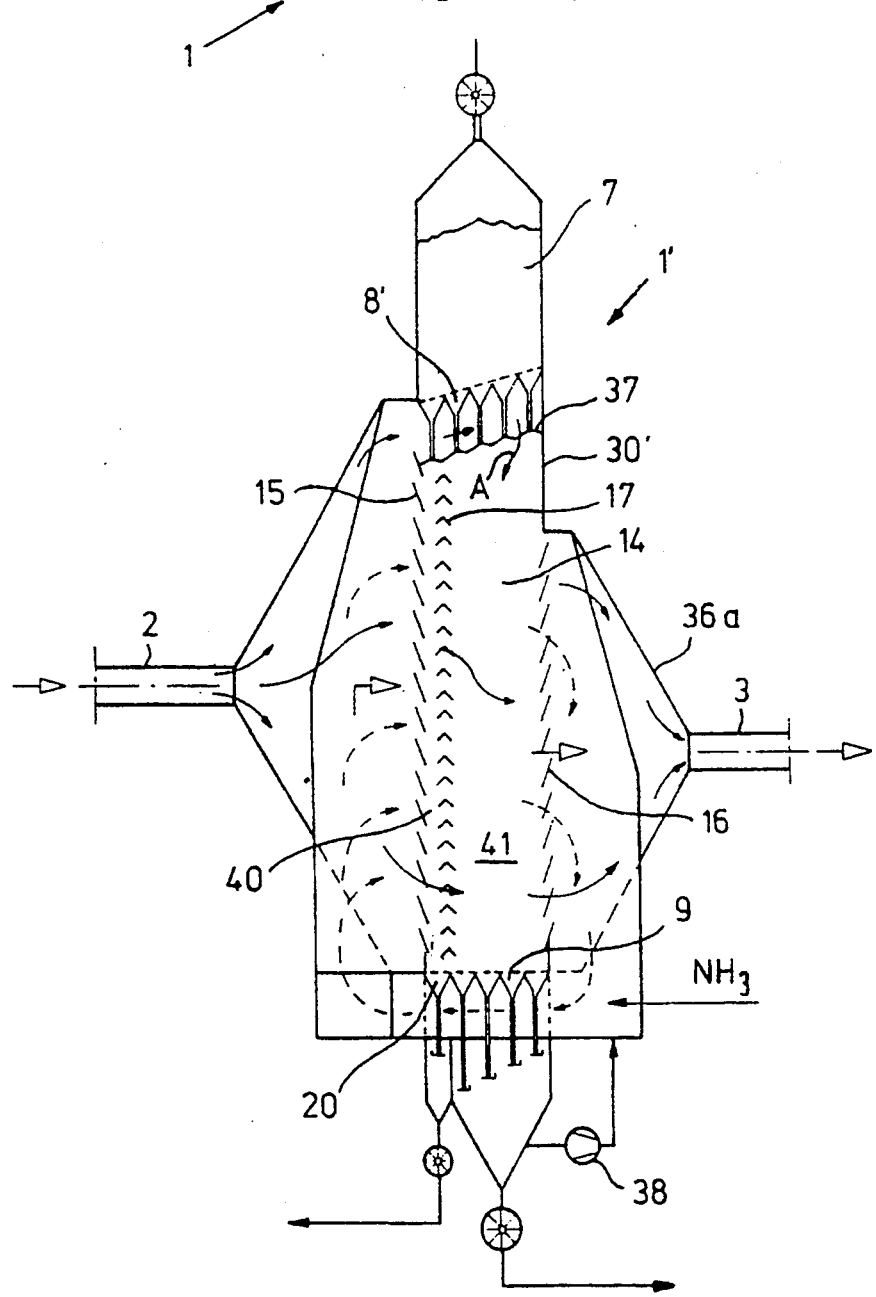
FIG. 3 is a view corresponding to FIG. 1 of a modified embodiment of the invention.

As can be seen in FIGS. 1 and 3, the reducing agent NH3 is introduced through nozzles at the rerouting point between the outlet duct 31 and the horizontal duct section 32. Other charging sites are, of course, also possible, or the active carbonized coal can also be initially charged into the chambers 5a and 5b.

The invention is not confined to any special exceptional conditions, either, with respect to the configurations and dimensions of the individual hoppers 18 and 20. The illustrated square cross-sectional shape, or optionally a rectangular cross-sectional shape, provides a particularly large-area utilization of the cross-sectional surface in packing distribution and affords favorable packing mechanics. However, different configurations are possible with, in principle, identical advantages according to this invention.

Frequently, differently large flow-exposed surfaces are suitable at the two reactor stages, particularly larger flow-exposed surfaces of the first stage 4 relatively to the second stage 5, in order to attain a fluid flow velocity adapted to the packing and to the adsorption characteristic. Specifically for enlarging its flow surfaces, the first reactor stage, instead of the second reactor stage, can be divided into two parallel partial chambers. The conductance of the fluid is, in such a case, of course reversed as compared with the illustration in FIG. 2.

Fresh packing for the exchange of exhausted adsorbent is contained in the storage container 7 separate for all chambers 5a, 4 and 5b. The important point is that, when adsorbing highly toxic substances and less aggressive media, a separation of the loaded adsorbent takes place. This is accomplished, in the described arrangement, simply by withdrawing adsorbent layers in correspondence with differing adsorption fronts into separate collecting tanks 25 and 26 (or into collecting tanks of the chambers 5a and 5b) and conveying these layers further from there. Such differing adsorption layers 40 and 41 are illustrated in FIG. 3. In the adsorption layer 40 on the inlet side, the largest portion of heavy metals, especially Hg, can be adsorbed, for example, and discharged via the discharge tubes 21 and the collecting tank 25.

The embodiment illustrated in FIG. 3 differs from the embodiment of FIG. 1, however, also by the feature that the distributor plate 8' is arranged to slant upwards from the inlet side toward the downstream side of the reactor 1'. Thereby the barrier section 30 is extended, with an otherwise identical design of the adsorber 1'. The sectional view according to FIG. 2 also applies to the embodiment according to FIG. 3.

The crude gas inlet 2 can, however, also extend to below the discharge plate 9; in this case, suitable openings toward the interior of the reaction chamber 14 are formed in the discharge hoppers 20, through which crude gas can enter, but no granular adsorbent can exit into the fluid inlet distributor. Such flow plates have been known, for example, from German Utility Model G 8,706,839.8. In case the discharge plate 9 is fashioned as a flow plate, a barrier zone corresponding to the wall 30 must also be provided on the rear wall directly above the plate 9 in order to avoid fluid short circuits toward the outlet duct 31.

A blower 38 is arranged with a connecting conduit between the larger collecting tank 26 and the duct section 32 and serves for breaking up any possible caking areas at the beginning of adsorbent discharge in the individual hoppers and/or in the outlet tubes, by means of an artificially enforced current through the exhausting of gas.

Figure 4:
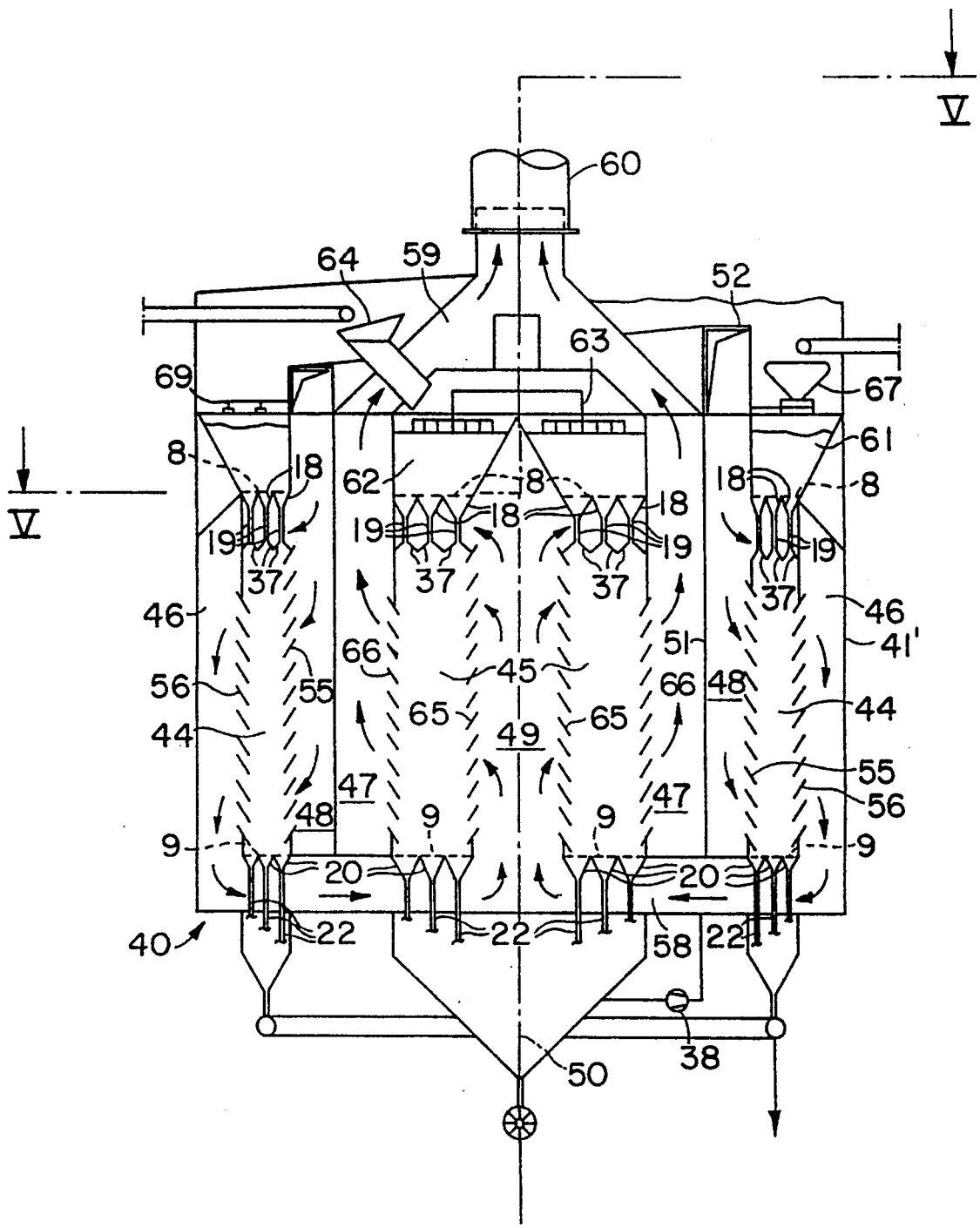
FIG. 4 is a vertical section through another embodiment of the adsorption apparatus according to the invention.
Figure 5:
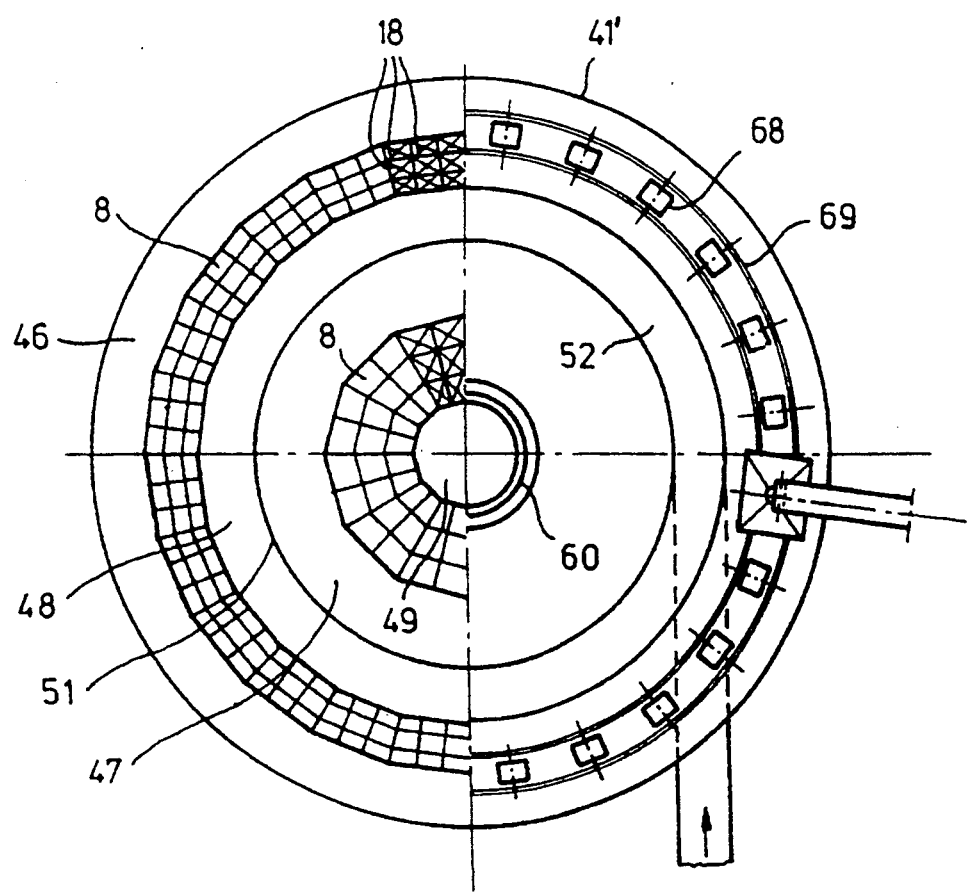
FIG. 5 is a sectional view along section line V—V in FIG. 4.

FIGS. 4 and 5 show a preferred embodiment of a two-stage reactor 40, the essential components of which are installed in a cylindrical reactor housing 41. In housing 41, two annular reaction chambers 44 and 45 are arranged so that they are nestled one inside the other concentrically. The annular chambers 44 and 45 are filled in the disclosed embodiment with differing adsorbents, for example, the outer annular chamber 44 with HFC and the inner annular chamber with pelletized active carbonized coal. Correspondingly, the outer annular chamber 44 serves for the separation of the more readily adsorbable pollutants (corresponding to the first stage 4 of the aforedescribed embodiment), and the inner annular chamber 45 serves for $NO_x$ reduction corresponding to chambers 5 of the aforedescribed embodiment. The first and second annular chambers 44 and 45 are each surrounded by annular fluid outlet ducts 46 and 47. The fluid inlet 48 is likewise a ring channel arranged on the radially inwardly located side of the annular chamber 44. The fluid inlet of the inwardly disposed second reactor stage 45 is a central duct 49 extending along the central axis 50 of the reactor 40. The ring-shaped fluid inlet 48 of the first reactor stage 44 and the likewise ring-shaped fluid outlet 47 of the second reactor stage 45 are separated by a partition 51 which, in the present case, is cylindrical.

A helical inlet duct 52 is arranged in the head zone of the reactor housing 41 coaxially around its central axis 50 and is connected with the ring duct 48 serving as the fluid inlet of the first reaction stage 44. Based on the helically shaped arrangement of the inlet duct 52, the fluid to be cleaned which in certain cases is loaded with solid particles and/or water droplets receives a relatively strong twist which latter urges the particles or droplets of a higher weight outwardly into the region above the charging cones 37 and between the feed hoppers or tubes 18, 19 of the first reaction stage. The design and arrangement of the feed and discharge hoppers, as well as the introduction of the fluid into the two reaction chambers 44 and 45 correspond to the conditions explained with reference to FIGS. 1–3. Based on the circular arrangement and subdivision of the distributor plates 8 and discharge plates 9, the hoppers 18 and 20, respectively, have, however, preferably a trapezoidal configuration, as can be seen from the lefthand half of FIG. 5.

Also the design of the louvers or other separating elements for limiting the reaction chambers 44 and/or 45 can correspond to that of the previously described embodiment, but in this case the partitions 55 and 56 (or 65 and 66) have, on the upstream and downstream sides, in accordance with the chamber cross section, a circular-ring-shaped configuration approximated by adequate segmenting.

As mentioned above, the uncleaned fluid enters the reactor housing 41 through the inlet duct 52 which latter imposes a twist, reaches the predominantly cylindrical flow surfaces in the region of the separating elements 55, intersects the annular first reaction chamber 44, exits at the downstream side of the latter through the separating elements 56 on the downstream side into the outer annular duct 46, is guided downwardly into a circular flow chamber 58, and there flows radially inwardly in the direction of the central fluid inlet 49 of the second reaction stage 45. In the circular flow chamber 58, the fluid flows around the discharge hoppers 20 and the discharge tubes 22 in a similar manner as in the above-described embodiment.

In the central fluid inlet 49, the fluid freed of the more quickly adsorbed pollutants, i.e. partially purified, is initially distributed axially and from there flows in correspondence with the arrows in a cross current or between the feed tubes 19 from above into the packing ring of the second reaction chamber 45. The separating elements 65 separate the reaction chamber 45 on the inlet side and the separating elements 66 separate the packing ring on the outlet side from the adjoining fluid ducts 49 and 47, respectively. The fluid duct 47 on the outlet side terminates in the head section into a discharge hopper 59 from where the pure gas can be conducted into a centrally arranged flue 60.

The flow-exposed surface of the first reaction stage 44 corresponding to the separating elements 55 is larger approximately in the ratio of the radii than the flow-exposed surface 65 of the second reaction stage 45. The flow velocity of the fluid in the first annular chamber is correspondingly lower as compared with that in the second annular chamber 45. This is definitely desirable, especially when using the differing adsorbents in the two annular chambers 44 and 45.

Storage chambers 61 and 62, respectively, likewise of an annular shape, are arranged above the annular plates 8. In and, respectively, above the inner storage chamber 62, a motor-driven distributing device is arranged in the shape of a circulating rake 63. The circulating rake 63 levels the packing present in the annular chamber 62 also when feeding is effected via a single, fixed charging nipple 64.

The storage chamber 61 associated with the first reaction stage 44 is charged with the aid of a rail cart 67 through cover wall openings 68 distributed circularly around the central axis 50. The cart runs on a continuous rail track 69 likewise concentric to the central axis 50. Preferably, the cart is provided with means for the airtight docking with the charging openings 68, an airtight-sealable loading chamber, and a blower for placing the loading chamber under pressure. With this design, the excess pressure ambient in the reaction chamber 44 and thus also in the storage space 61 can be compensated for in the loading chamber of the cart 67 so that no flue gas can escape into the cart and from there into the surrounding atmosphere.

The invention is not limited to the illustrated embodiments. Thus, it is readily possible within the scope of the invention to work with a single adsorption layer. Also, the flow direction of the fluid can be reversed, for example, in FIG. 1, so that the crude gas enters the adsorber 1 at 3 and leaves the latter at 2. On the head side, the crude gas will then exit from the adsorption layer.

I claim:

1. Apparatus for the separation of undesirable constituents from a waste gas, comprising means defining a vertical bed of adsorbent having an upper end and a lower end, means for supplying adsorbent to the upper end and for removing adsorbent from the lower end, said supplying means comprising a grid comprised by a plurality of feed hoppers arranged in side-by-side relationship and one behind the other, said feed hoppers having spaces therebetween and being positioned to deliver adsorbent onto an exposed uppermost surface of said bed, and means for supplying waste gas to said spaces between said hoppers and thence to said uppermost surface of said bed to pass downwardly through said uppermost surface and through said bed and thereafter leave said bed, and means for removing waste gas that has passed through said bed.

2. Apparatus as claimed in claim 1, said means defining a vertical bed comprising gas-permeable means so constructed and arranged that a portion of said waste gas passes through said defining means to enter said bed and the rest of said waste gas passes through said uppermost surface of said bed to enter said bed.

3. Apparatus as claimed in claim 2, said gas-permeable means comprising louvers.

4. Apparatus as claimed in claim 1, said removing means comprising a plurality of discharge hoppers arranged in side-by-side relationship and one behind the other with spaces therebetween, and means for passing gas that has left said bed through said spaces between said discharge hoppers.

5. Apparatus as claimed in claim 4, said apparatus also comprising means defining a second vertical bed of adsorbent, and means for passing waste gas that has passed through said spaces between said discharge hoppers through said second bed of adsorbent.

6. Apparatus as claimed in claim 1, said means defining a vertical bed comprising a pair of spaced vertical gas-permeable walls containing said bed between them, said walls being constructed and arranged such that a portion of said gas entering said bed through one of said walls and the remainder of said gas entering said bed from between said feed hoppers and through said uppermost surface, and a gas-impermeable wall extending from said feed hoppers on the side of said bed opposite said one wall, the other said gas-permeable wall extending only below said gas-impermeable wall, thereby to prevent short circuiting of said gas from between said feed hoppers directly to said gas removing means.

7. Apparatus as claimed in claim 6, wherein said gas-permeable wall on said one side bed is taller than said gas-permeable wall on the other side of the bed.

* * * * *